May 25, 1965 E. W. LEAVER ETAL 3,185,847
QUENCH CIRCUIT FOR RADIATION COUNTER TUBE
Original Filed April 18, 1957
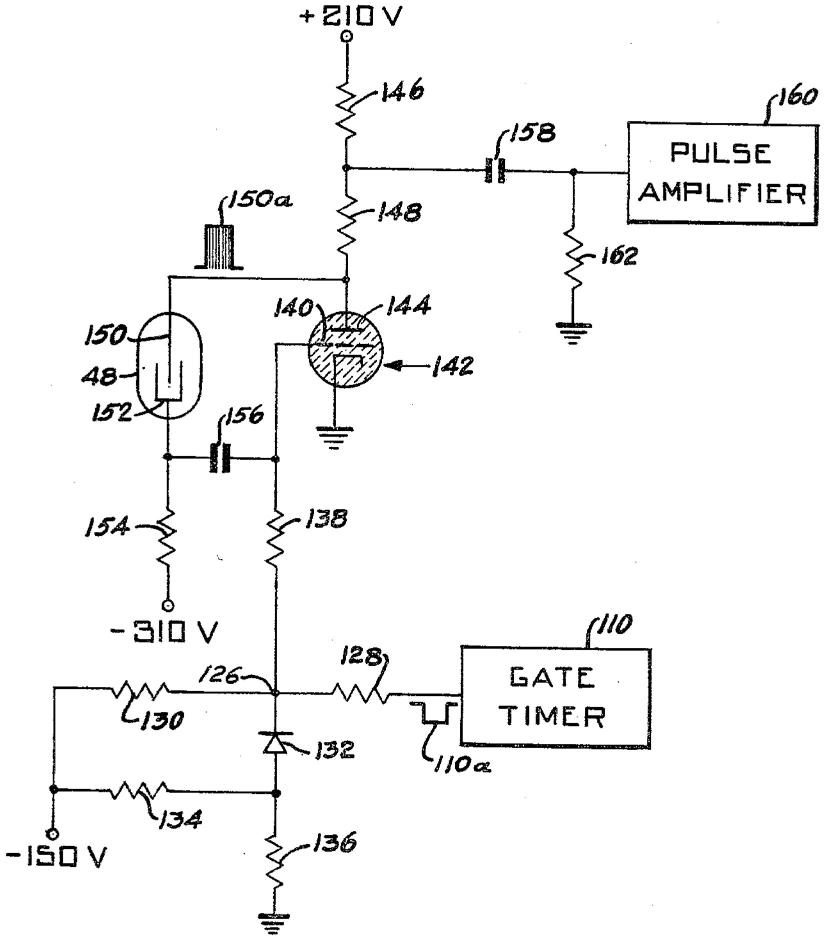
INVENTORS
ERIC W. LEAVER
GEORGE R. MOUNCE
BY Norbert Ederer
THEIR ATTORNEY United States Patent Office 3,185,847

Patented May 25, 1965

3,185,847

QUENCH CIRCUIT FOR RADIATION COUNTER TUBE

Eric W. Leaver and George R. Mounce, Willowdale, Ontario, Canada, assignors to Electronic Associates Limited, a Canadian company Original application Apr. 18, 1957, Ser. No. 653,570, now Patent No. 3,038,606, dated June 12, 1962. Divided and this application Feb. 6, 1962, Ser. No. 181,494
2 Claims. (Cl. 250—83.6)

This invention relates to a quench circuit for radiation counter tubes.

This application is a division of our copending application Serial No. 653,570, filed April 18, 1957, now Patent No. 3,038,606, dated June 12, 1962, hereinafter referred to as the parent patent.

Radiation counter tubes, also known in the art as Geiger-Müller tubes, are useful in apparatus for the measurement of physical properties of materials without physically contacting the subject material to be measured. For example, in the parent patent there is described measurement apparatus wherein a radiation counter tube is used in apparatus for the measurement of liquid level contained in cans which are transported at high speed on a conveyor belt. A radiation counter tube, when subjected to a sufficiently high potential between anode and cathode, will generate short duration pulses in response to radiation incident thereon, the higher the intensity of incident radiation the faster the rate of occurrence of the pulses.

As is well known, Geiger tubes have a life which is limited to a finite number of pulses produced, and it is a principal object of the invention to provide a novel quench circuit which is effective to quench rapidly each generated counter pulse to prolong the tube life.

The invention features connection of the radiation counter tube in a regenerative feedback loop of an amplifier. The amplifier is so biased as normally to be at an extreme of current conduction and in consequence of amplifier-radiation counter tube interconnections specified hereinafter the counter tube anode-cathode potential is maintained below the striking potential of the counter tube. That is, even though radiation may be incident on the tube, no counter pulses are generated. When it is desired to generate counter pulses, a gating signal is introduced into the feedback loop. The gating signal enables generation of the counter pulses, which are amplified regeneratively by the amplifier in such a fashion that each generated counter pulse is immediately quenched.

The herein disclosed circuit may be advantageously utilized to prolong the life of either self-quenching or non-self-quenching radiation counter tubes. The invention will be better understood from the following, more detailed description, considered together with the accompanying single figure schematic drawing of a preferred embodiment of the invention.

The circuitry illustrated in the drawing is an abridged version of FIGURE 3 of the parent patent, and to the extent practicable, the same reference numerals are utilized for corresponding parts.

Referring to the drawing, a radiation counter tube or Geiger-Müller tube is designated by 48. The tube 48, when subjected to incident radiation, for example in the manner shown in the parent patent, is capable of generating short duration counter pulses, but only when enabled by the action of gate timer 110. The gate timer normally delivers output potential of approximately +210 v., and this relatively high potential normally inhibits generation of the counter pulses by the action of intervening circuitry described below.

The gate timer 110 generates gating pulses, such as the pulse 110*a* to enable generation of the radiation count pulses. Such a pulse 110*a* may be generated whenever it is desired to generate and count the radiation counter pulses, for example, in a manner described in the parent patent. In the representation of the gating pulse 110*a*, the upper level is intended to be the disabling level of +210 v. and the lower level corresponds to the time interval for gating the Geiger tube 48. The negative gate pulse 110*a* is attenuated at the circuit junction 126 by reason of the voltage division between resistors 128 and 130, one end of each of which is connected to the circuit junction 126 and the other ends of which are respectively connected to gate timer 110 and the negative direct voltage source −150 v. Moreover, the lower excursion of the pulse is limited to a level of −10 volts by means of the clamping diode 132, whose anode is tied to the junction 126 and whose cathode is at a potential of −10 volts obtained by the voltage division of a resistor 134 connected between the −150 v. source and the cathode of diode 132, and of resistor 136 connected between said cathode and ground.

There is also connected to the circuit junction 126 an end of a grid leak resistor 138 whose other end is connected to the grid 140 of a normally saturated triode 142, which serves as a combined gate, quencher and amplifier for the Geiger tube. The diagonal hatching of triode 142 indicates normal saturation condition. The cathode of triode 142 is grounded. Normally the potential of the circuit junction 126 is +12 volts, the potential of the grid 140 is 0 volts, and the potential of the anode 144 of triode 142 is about +40 volts due to the heavy flow of plate current from the +210 v. line through resistors 146 and 148 connected therefrom to the anode 144. The anode 150 of the Geiger tube 48 is conductor connected to the anode 144 of the triode 142 and is therefore also normally at a potential of about +40 volts. The cathode 152 of the Geiger tube 48 is connected through resistor 154 to a negative direct voltage source −310 v. and is normally at this potential. The cathode is also signalwise coupled to the grid 140 by means of a capacitor 156.

The normal net anode to cathode potential of the Geiger tube 48 of 350 volts is below the Geiger striking voltage and normally no Geiger pulses are produced. The negative pulse 110*a* appearing at the junction 126 is transmitted by resistor 138 to the grid 140 and also through capacitor 156 to the cathode 152, driving tube 142 to below cutoff, raising the potential of anodes 144 and 150 to +210 volts, which appears as a positive pulse 150*a* at said anodes with a duration substantially the same as the negative pulse 110*a* of the gate timer 110. Initially the cathode of the Geiger tube drops below −310 v., owing to the transmission of the negative pulse through capacitor 156. This coupled with the rise of the potential of the anodes 144 and 150 to +210 volts results in an anode to cathode potential for the Geiger tube exceeding striking potential. Accordingly, Geiger pulses are generated which have positive leading edges at cathode 152 and negative leading edges at anode 150. Each positive cathode Geiger pulse is transmitted from cathode 152 through capacitor 156 to the grid 140 and cause momentary conduction of tube 142 again, so that the negative pulse at the anodes 144 and 150 due to Geiger action alone is regeneratively amplified due to the Class C amplifying action of tube 142. Each Geiger pulse appears as an amplified negative pulse of about 25 volts magnitude in an envelope of the positive gate pulse appearing at anodes 144 and 150, as shown at 150*a*. The 25 volt drop coupled with the corresponding potential rise at the cathode 152 is sufficient to cause momentary quenching or extinction of the Geiger action. Upon each extinction the anode to cathode potential of Geiger tube 48 reverts to above striking potential and the next Geiger pulse is produced and immediately extinguished. Alternate pulse generation and immediate extinction is repeated for the duration of the gate pulse 110*a* from the gate timer 110, whereafter Geiger operation is once more inhibited with tube 142 reverting to the normal saturated condition. The pulse of multivibrator 98 thus serves to gate operation of the Geiger tube 48 through the intervening means of triode 142 and associated circuitry and triode 142 also serves to quench and amplify the Geiger pulses. The number of Geiger pulses during the gate time interval is of course dependent on the radiation received by the Geiger tube 48.

The Geiger pulses and their envelope are picked off from the junction of resistors 146 and 148 and fed through a capacitor 158 to the input of a pulse amplifier 160. The grid leak resistor 162 and capacitor 158 connected thereto are selected to have a time constant sufficiently short to filter out the envelope of the Geiger pulses while fully transmitting the Geiger pulses themselves.

It should be understood that the aforegoing description has been presented by way of example and not by way of limitation, reference being had to the appended claims rather than the aforegoing description to determine the scope of the invention.

What is claimed is:

1. In combination with a radiation counter tube having an anode and a cathode, a quench circuit therefor comprising an electron tube having an anode, a cathode and a grid, a source of operating potential having at least one high potential terminal and at least one low potential terminal, means including resistor connecting the cathode of said counter tube to one of said low potential terminals, means connecting the anode of said counter tube to one of said high potential terminals and the anode of said electron tube to one of said high potential terminals, said last-named means including a resistance providing a path for the anode currents of both of said tubes, means connecting the cathode of said electron tube to one of said low potential terminals, so as to bias said electron tube for plate current saturation whereby the anode to cathode potential of said counter tube is normally below its striking potential, means coupling said counter tube cathode to said grid and means for applying a negative gate pulse through said coupling means simultaneously to the grid of said electron tube and the cathode of said counter tube thereby to cut off the plate current of said electron tube and enabling generation of pulses by said counter tube momentarily and immediately quenching each of said pulses.

2. In combination with a radiation counter tube having an anode and a cathode and adapted to produce count pulses responsive to radiation incident thereupon and with voltage supply circuitry therefore, the latter including impedance means and a circuit junction at which are generated voltage pulses corresponding to said count pulses when said tube is activated, a normally inactivated amplifier having an output terminal conductively coupled to said anode and an input terminal coupled to said circuit junction for reception of said voltage pulses at said input terminal, the couplings and tube being arranged to constitute a regenerative feedback loop for said amplifier when it is activated, means for biasing the amplifier so that its output terminal is normally at an extreme of current conduction and the tube anode-to-cathode potential is normally below striking potential for normally inactivating both the tube and amplifier, and means to introduce into said feedback loop a gating pulse effective to drive said amplifier to an opposite extreme of current conduction thereby to enable generation of count pulses by said counter tube, said voltage pulses being generated at said circuit junction, each such voltage pulse being transmitted via the input terminal coupling to said input terminal, and in regeneratively amplified form via the amplifier output-anode coupling so as to drive the amplifier momentarily toward its original extreme of current conduction to extinguish said counter tube and terminate such pulse.

References Cited by the Examiner

UNITED STATES PATENTS

| | | | |
|---|---|---|---|
| 2,418,892 | 4/47 | Lord | 250—83.6 |
| 2,745,019 | 5/56 | Hamacher | 250—83.6 |

RALPH G. NILSON, *Primary Examiner.*

ARCHIE R. BORCHELT, *Examiner.*